United States Patent [19]

Haynes

[11] Patent Number: 4,550,651
[45] Date of Patent: Nov. 5, 1985

[54] BATCH-BREWING COFFEE SYSTEM

[75] Inventor: Joel Haynes, Tarzana, Calif.

[73] Assignee: Richard B. Mindlin, Prairie Village, Kans.

[21] Appl. No.: 442,947

[22] Filed: Nov. 19, 1982

[51] Int. Cl.⁴ .............................................. A47J 31/00
[52] U.S. Cl. ........................................ 99/279; 99/307; 426/433
[58] Field of Search ............... 99/275, 279, 290, 316, 99/291, 300, 288, 302 R, 304, 305, 307, 317, 280, 281, 282, 283; 426/433

[56] References Cited

U.S. PATENT DOCUMENTS 1,637,286  7/1927  Turner ................................ 99/307
2,890,643  6/1959  King .................................. 99/290
3,641,918  2/1972  Schellgel ............................ 99/279
3,830,940  8/1974  Sivetz ................................ 426/433
4,384,512  5/1983  Keith ................................. 99/316

Primary Examiner—Robert W. Jenkins
Attorney, Agent, or Firm—Charmasson & Holz

[57] ABSTRACT

A batch-brewing coffee system brews a number of cups of coffee at the same time and stores the brewed coffee at a reduced temperature until it is needed to prevent deterioration of flavor. The coffee is then dispensed as needed, with an approximately one cup of volume being either quickly heated in a heat exchanger on demand, or alternatively approximately one cup of coffee could be maintained hot and ready to dispense on demand.

16 Claims, 7 Drawing Figures

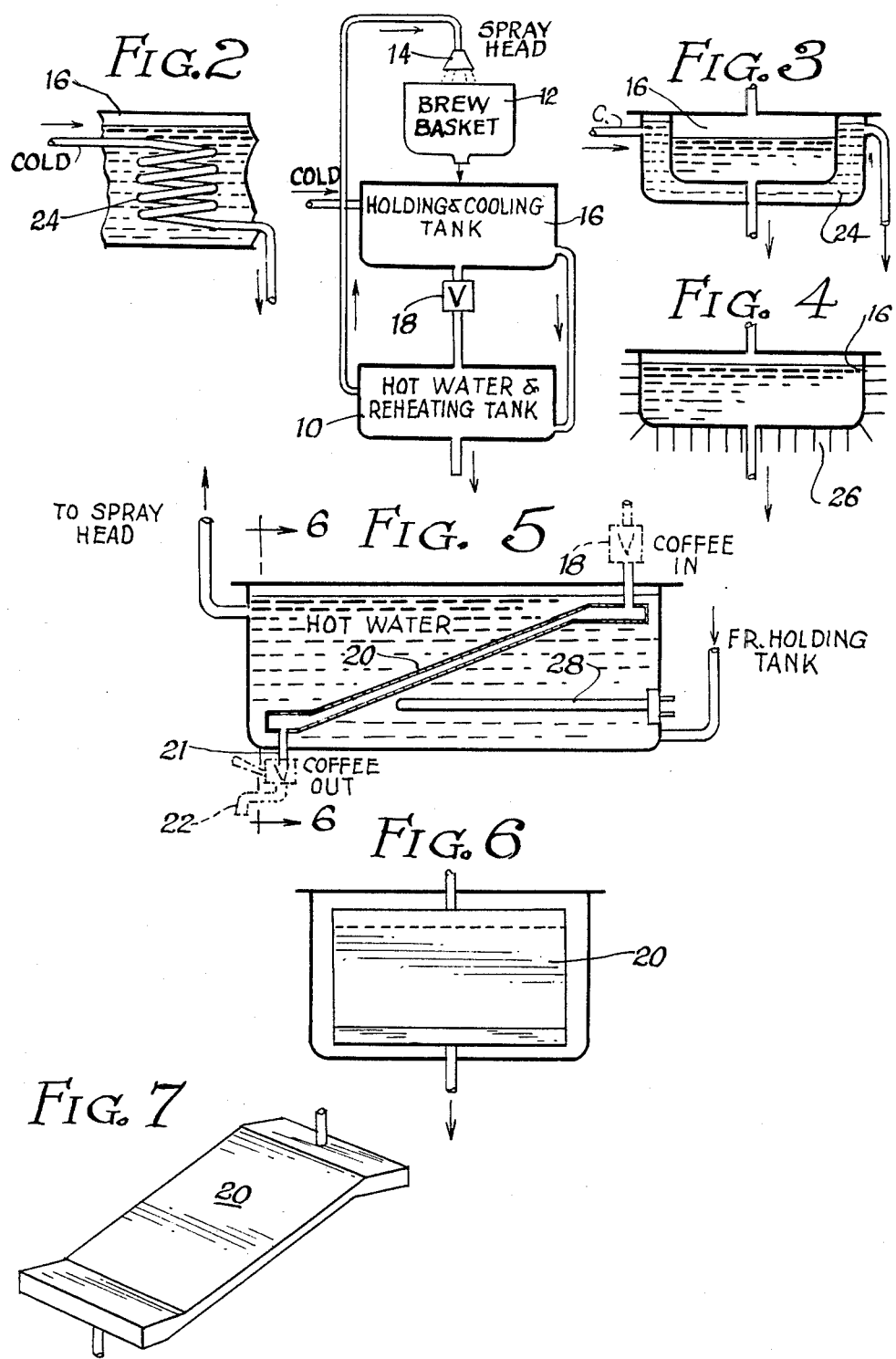

BATCH-BREWING COFFEE SYSTEM

BACKGROUND OF THE INVENTION

Many coffee brewers and systems have been designed to brew coffee in small and large quantities. These systems range from small home-style brewers to large commercial brewers found in restaurants. Likewise, a large variety of coffee is available on the market from raw coffee beans of varying types to freeze-dried and other instant blends.

It is generally accepted that the best, most flavorful and desirable coffee is fresh batch-brewed coffee as is served in coffee houses and restaurants. Single-cup brewers such as found in some vending machines produce a coffee that is considered far less desirable.

There are many fresh batch-brewer systems which include a holding tank in which the brewed coffee is stored, mainly at the proper drinking temperature, and then dispensed on demand. This type of brewer, common in coin-operated machines, is also used in office coffee service and related systems. The quality of coffee from the hot coffee holding reservoir is good right after brewing, but continually decreases overtime until it becomes very strong and unpleasent tasting, which only takes about an hour.

The continual degrading in quality is primarily attributable to the need to keep the brew at an elevated temperature (approximately 170° F.) in order to dispense the coffee at drinking temperature. The temperature is ordinarily maintained by added heaters or by designing a holding tank so that it holds a temperature over the required period because of its insulation. In any event, while the coffee is being held in this reservoir the elevated temperature causes an undesirable cooking of the coffee resulting in the evolution of an unpleasant taste.

Taste tests have shown that if the coffee is cooled after brewing to an ambient temperature, and then stored in the holding reservoir, and not heated until needed, the storage life is significantly increased. The strong, harsh taste is not present even after hours of storage. The only apparent degradation of flavor and aroma takes place only gradually, and even then does not start until more than three hours after the coffee has been brewed.

SUMMARY OF THE INVENTION

The present invention provides a means for fresh batch-brewing of coffee, holding the brew within the reservoir where it is cooled, and then heating it cup-by-cup, and only when the coffee is dispensed. This is acheived by a primary holding tank into which the fresh brewed coffee is poured, and a subsequent stage in the dispensing passageway of the coffee in which approximately a one-cup quantity is quickly re-heated, but not boiled, such as by a heat exchanger disposed in a hot water reservoir, with the hot water being used to brew the next batch of coffee.

BRIEF DESCRIPTION OF THE DRAWINGS

FIG. 1 is a diagrammatic illustration of the entire brewing system;

FIG. 2 is diagrammatic view of a heat exchange coil which would be found in the cooling tank;

FIG. 3 is a heat exchange system utilizing a hot water jacket around the storage reservoir;

FIG. 4 illustrates yet another embodiment of the coffee cooling reservoir wherein the reservoir is fitted with heat dissipation radiator fins;

FIG. 5 is a somewhat diagrammatic section taken through the hot water reservoir;

FIG. 6 is a section taken along line 6—6 of FIG. 5; and

FIG. 7 is a perspective view of the heat exchanger element used for reheating the coffee.

DETAILED DESCRIPTION OF THE PREFERRED EMBODIMENTS

The invention is described as a coffee brewing system and coffee grounds are mentioned in the specification and claims, because coffee is by far the preferred hot brewed beverage in the United States. However, the system might also be used with tea, chicory, or any other brewed beverage involving the passage of hot water into contact with the flavoradding elements. To the extent that this system is usable to brew other beverages, the term "coffee" and "coffee grounds," used throughout this text for convenience, is hereby defined to include any brewed beverage brewed from any flavoring stock in which the system is useful.

Turning now to the illustrated embodiments, FIG. 1 illustrates the basic operation of the system wherein a hot water reservoir 10 provides hot brewing water for the brewing basket 12 through the head 14. After the coffee is brewed, it flows into the holding and cooling tank 16. A valve 18, operated by the user, causes one cup of coffee to be dropped into the heat exchanger 20, shown in FIG. 5, allowing it to absorb heat from the hot water reservoir 10, as it flows down to the dispensing outlet 21. Although any type of heat exchanger could be used which would ensure against boiling, the heat exchanger 20, better seen in FIG. 7, comprises a flat, hollow, thin chute operated under action of gravity to permit the coffee to contact the hot water in the tank from both above and below.

By utilizing the valve 18, the coffee is not heated until the moment it is demanded, at which time it is dumped into the heat exchanger 20. As an alternative method, a spigot 22 could be used without the valve 18, which would permit approximately one cup's worth of coffee to stand in the heat exchanger 20 until it is drawn off by the user. This would not defeat the purpose of the system, inasmuch as although the cup of coffee would be standing at drinking temperature for a period of time, it would only be the period of time between uses, generally just a few minutes, as opposed to several hours between the time the coffee is first brewed and the time the last cup is drawn off.

Several alternative means of cooling the fresh brewed coffee are shown. FIG. 2 illustrates a heat exchanger 24 which passes fresh, cold water through the pipes on its way to the hot water reservoir 10, inside the holding and cooling tank 16. This same concept could be implemented by the heat exchange system shown in FIG. 3, wherein the incoming water forms a cooling water jacket 24 around the coffee to be cooled. FIG. 4 illustrates a vaned heat radiator 26, which could be used by itself, or in conjunction with either of the systems shown in FIGS. 2 and 3.

Although when using the incoming cold water in a heat exchanger as shown in FIGS. 1 through 3 the water will pick up some heat, it must be heated further, as is accomplished in the illustrated embodiment by the use of the electric heater element 28 extending into the hot water reservoir.

The system as illustrated and described herein provides a whole new technique of brewing and storing coffee, and will be a blessing in restaurants and offices and other environments in which coffee drinkers play Russian roulette with the coffee quality as the day wears on.

While the preferred embodiments of the invention have been described, other modifications may be made thereto and other embodiments may be devised within the spirit of the invention and the scope of the appended claims.

What is claimed is:

1. A coffee brewing and dispensing system comprising:
    (a) a brewing basket for holding coffee grounds and producing hot brewed coffee upon the introduction of hot water therein;
    (b) a holding and cooling tank for receiving and cooling a substantial volume of hot brewed coffee from said basket and storing same at a reduced temperature available for use on demand; said tank including cooling means for cooling said coffee; and
    (c) means for draining off and quickly heating small volumes of cooled coffee from said tank as needed.

2. A coffee brewing and dispensing system comprising:
    (a) a brewing basket for holding coffee grounds and producing hot brewed coffee upon the introduction of hot water therein;
    (b) a holding and cooling tank for receiving and cooling said hot brewed coffee from said basket and storing same at a reduced temperature available for use on demand: said tank including cooling means for cooling said coffee; and
    (c) means for drawing off and quickly heating cooled coffee from said tank as needed, said means comprising a hot water reservoir and a coffee dispensing passageway which passes coffee in thermal contact with said reservoir to exchange heat therewith.

3. Structure according to claim 2 wherein said dispensing passageway includes a flattened hollow chute disposed inside said reservoir and which passes cooled coffee internally from one end thereof to the other.

4. Structure according to claim 3 wherein said chute delivers coffee to a coffee dispensing spigot.

5. Structure according to claim 2 wherein said reservoir holds hot water to be delivered to said brewing basket.

6. Structure according to claim 5 wherein said reservoir includes a heat source.

7. Structure according to claim 2 wherein said holding and cooling tank is cooled by the passage of a cold water supply passageway and thermal contact with hot brewed coffee in said tank as the cold water passes through said passageway on the way to being heated for use in brewing coffee.

8. Structure according to claim 7 wherein said cold water supply passageway includes a cooling jacket at least partially surrounding said tank.

9. Structure according to claim 7 wherein said fresh water passageway includes heat exchanger coils immersed in said tank.

10. Structure according to claim 2 wherein said tank thermally communicates with heat dissipation means.

11. Structure according to claim 10 wherein said heat dissipation means comprises a vaned radiator extending across a portion of the tank surface.

12. Structure according to claim 2 wherein said system includes a spigot in line with said means for drawing off and quickly heating, such that coffee is backed up behind said spigot creating a pressure head, and operation of said spigot causes coffee to pass from said tank through said means and out of said spigot as needed.

13. Structure according to claim 12 wherein said means for drawing off and quickly heating includes a heat exchanger having an internal coffee containing volume small in relation to the volume of said tank.

14. Structure according to claim 2 wherein said means for drawing off and quickly heating includes a heat exchanger and a valve upstream of said heat exchanger such that coffee is evacuated from said heat exchanger between dispensing operations of said valve.

15. In a hot beverage brewing system having means for brewing the beverage and discharge of the beverage through a discharge outlet, the improvement comprising:
    (a) a holding and cooling vessel connected with said discharge outlet for receiving and cooling said beverage to a first temperature which is substantially below the brewing temperature said vessel including cooling means for cooling said beverage;
    (b) means for drawing and dispensing beverages from said vessel in controlled volumetric increments, said means defining an enclosed flow path for said beverage terminating at a dispensing outlet; and
    (c) means for heating the beverage while flowing in said flow path so that its temperature at the dispensing outlet is higher than said first temperature.

16. A beverage brewing and dispensing system comprising:
    (a) brewing means for brewing said beverage and producing hot brewed beverage;
    (b) a holding and cooling vessel for receiving and cooling a substantial volume of hot brewed beverage from said brewing means and storing same at a reduced temperature available for use on demand, said vessel including cooling means for cooling said beverage; and
    (c) means for draining off and quickly heating cooled beverage from said vessel as needed, said means including heating means for heating the beverage as it is draining off from said vessel.

* * * * *